July 30, 1935. P. E. MATTHEWS 2,009,507
CLUTCH
Filed April 14, 1933

INVENTOR
Philip E. Matthews,
BY Redding, Greeley, O'Shea & Campbell
HIS ATTORNEYS Patented July 30, 1935

2,009,507

UNITED STATES PATENT OFFICE 2,009,507

CLUTCH

Philip E. Matthews, Plainfield, N. J., assignor to International Motor Company, New York, N. Y., a corporation of Delaware Application April 14, 1933, Serial No. 666,111

2 Claims. (Cl. 192—53)

The present invention relates to clutches and embodies, more specifically, an improved clutch construction wherein one of the relatively rotating elements of a clutch may be selectively engaged and disengaged with the member upon which it is mounted and with which it has a driving engagement.

In certain forms of clutches where the capacity of the clutch is such as to require a disc of relatively large diameter, it is desirable that the disc be disconnected with the driving shaft upon which it is mounted during the shifting operation of the transmission mechanism in connection with which the clutch is used. In order that a mechanism for effecting such disengagement may be provided, the present invention has been designed and an object thereof is to provide a clutch construction having means incorporated therein to disengage the clutch disc from the driving shaft during the disengaging operation of the clutch.

A further object of the invention is to provide a clutch construction wherein means is provided to disengage the driving connection between a clutch disc and its driving shaft when the clutch is disengaged and means is further provided to synchronize the engaging operation of the members by means of which disengagement of the disc and shaft is effected.

Further objects, not specifically enumerated above, will be apparent as the invention is described in greater detail in connection with the accompanying drawing, wherein.

Figure 1:
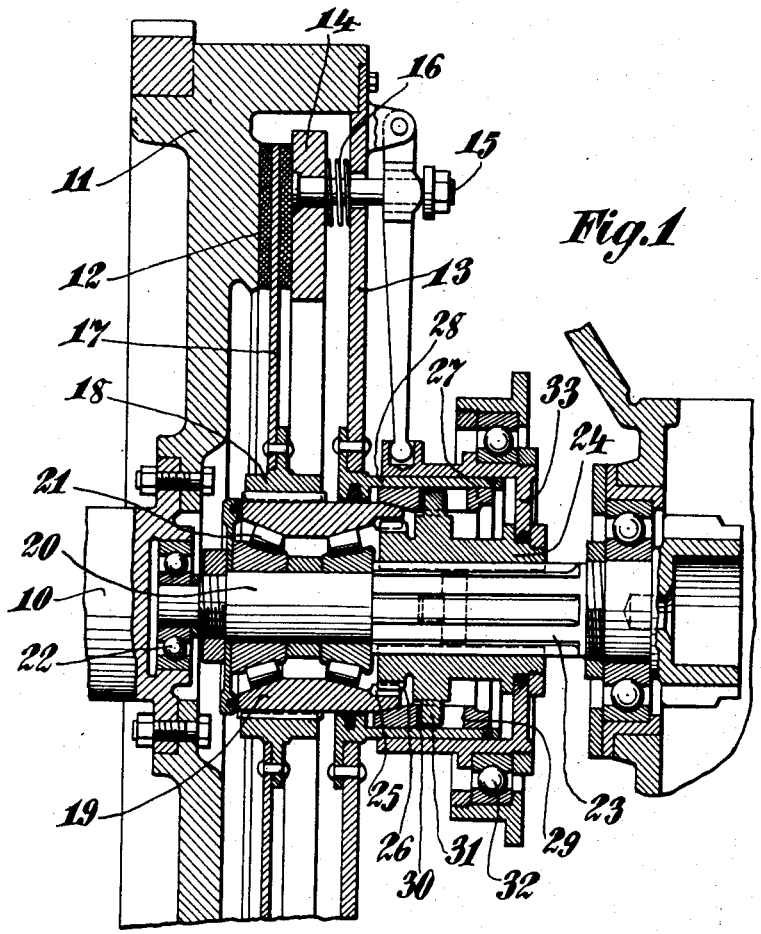
Figure 1 is a view in section, taken in a plane passing through the axis of a clutch constructed in accordance with the present invention.

Referring to the above drawing, a driving shaft is shown at 10, upon which a flywheel 11 is mounted. The flywheel is formed with a clutch face 12 and provided with a cover 13 upon which a movable clutch disc 14 is mounted. Shafts 15 and springs 16 serve to urge the disc 14 toward the face 12 and into engagement with a clutch disc 17 which is mounted upon a sleeve 18. Sleeve 18 is secured to a sleeve 19 which is journaled upon a drive shaft 20 by means of roller bearings 21. Drive shaft 20 may be journaled at 22 in the end of the driving shaft 10 and is connected through a splined connection 23, with a sliding member 24. At the end of the sleeve 19 adjacent the sliding member 24, the ring is formed with internal teeth 25 which are adapted to be engaged by external teeth 26 formed on the sliding member 24. The external surface of the sleeve 19 adjacent the teeth 25 is conically formed and adapted to engage a cooperating conical surface formed upon a balk ring 27. This ring is slidably mounted within a cylindrical housing 28, secured to the member 13, and is formed with one or more grooves 29 having recesses 30. One or more teeth 31 are formed on the sliding member 24 and adapted to engage the grooves 29.

Figure 2:
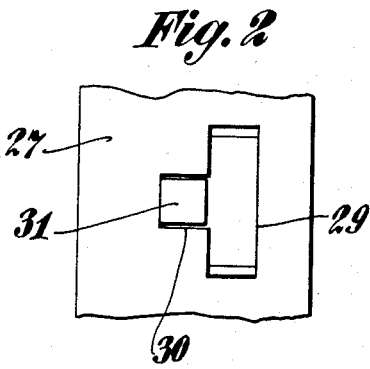
Figure 2 is a plan view of the balk ring and tooth engaging therewith when the clutch is in its engaging position.
Figure 3:
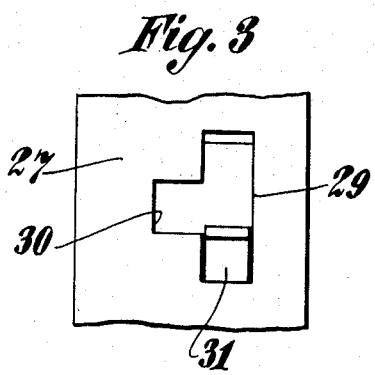
Figure 3 is a view similar to Figure 2, showing the position of these elements when the clutch is disengaged.

The sliding member 24 is connected to the clutch throw-out bearing 32 through a flange 33 and the operation of the mechanism is as follows. When the clutch is engaged, the teeth 31 engage recesses 30 and the elements are in the position shown in Figures 1 and 2. Driving connection from disc 17 to shaft 20 is provided through the sleeve 19, teeth 25 and 26, and sliding member 24. When the clutch disc 17 is disengaged, sliding member 24 is moved to the right, as viewed in Figure 1, and the teeth 25 and 26 are thus disengaged. Teeth 31 engage the right hand side of grooves 29 and the balk ring 27 is moved to the right. Rotation of the sliding member 24 causes the teeth 31 to engage one end of the grooves 29, as shown in Figure 3.

When the clutch is engaged, initial movement of the sliding member 24 to the left, as viewed in Figure 1, causes the teeth 31 to move the balk ring to the left and the conical surfaces formed on the members 19 and 27 are brought into engagement. As soon as members 19 and 27 are synchronized, the teeth 31 slip into recesses 30 and the teeth 25 and 26 are engaged.

It will thus be seen that a clutch construction has been provided wherein the clutch disc is automatically disengaged and engaged with the shaft upon which it is mounted in accordance with the disengaging and engaging action of the clutch mechanism.

While the invention has been described with specific reference to the accompanying drawing, it is not to be limited, save as defined in the appended claims.

I claim as my invention:

1. A clutch and clutch operating means, said clutch having a clutch disc and a shaft upon which the disc is mounted, a spring to move the clutch means into engaging position, teeth formed on the disc, a slidable member on the shaft, teeth on the slidable member to engage the first teeth, means to actuate the slidable member, a balk ring having a friction surface adapted to engage the disc to synchronize the speeds thereof before engagement of the teeth thereon, said ring having a circumferential groove and a recess on the side of the groove adjacent the disc, a projection on the slidable member to engage the groove, and means to operate the means to actuate the slidable member by the clutch operating means whereby the spring operates both the clutch and the synchronizing means.

2. A clutch and clutch operating means, said clutch having a clutch disc and a shaft upon which the disc is mounted, a clutch spring to move the clutch means into engaging position, teeth formed on the disc, a slidable member on the shaft, teeth on the slidable member to engage the first teeth, means between the slidable member and disc to synchronize the speeds thereof before engagement of the teeth therein, and means to actuate the synchronizing means by the clutch operating means whereby the clutch spring operates both the clutch and the synchronizing means.

PHILIP E. MATTHEWS.